Dec. 2, 1958 — O. A. YOST — 2,862,522
FLOW-INDUCING PIPE FITTING
Filed Jan. 28, 1957

INVENTOR.
Oscar A. Yost
BY
ATTORNEY

2,862,522

FLOW-INDUCING PIPE FITTING

Oscar A. Yost, New York, N. Y.

Application January 28, 1957, Serial No. 636,679

4 Claims. (Cl. 138—37)

This invention relates to a flow-inducing pipe fitting.

It is the principal object of the present invention to provide a pipe fitting adapted to be placed in a pipe line that is constructed to induce and increase the spiraling movement of the liquid in passing through the pipe line and thereby reduce the resistance to flow and to keep the pipe line free of sediment.

It is another object of the invention to provide in a flow-inducing pipe fitting a set of ribs angularly-spaced apart upon the interior wall of the fitting whereby the ribs may be angularly-adjusted upon the interior surface of the fitting in amounts and direction depending upon the strength and direction of the Coriolis force for the particular location upon the global surface at which the flow-inducing pipe or fitting is being used whereby an advantage may be taken of this Coriolis force.

Further objects of the invention are to provide a flow-inducing pipe fitting, having the above objects in mind, which is of simple construction, easy to adjust or bend, inexpensive to manufacture, easy to install within the pipe line, adaptable for elbows and other types of fittings, compact, durable, efficient and effective in use.

Figure 1:
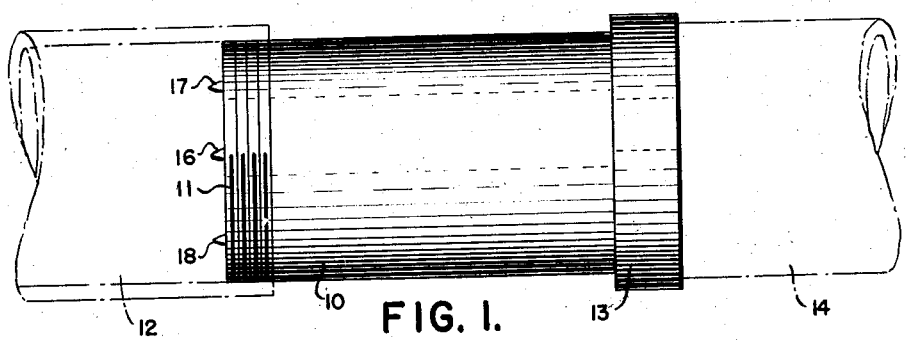
Figure 2:
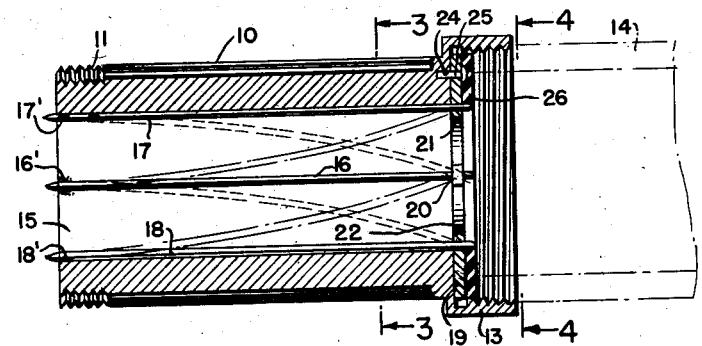
Figure 3:
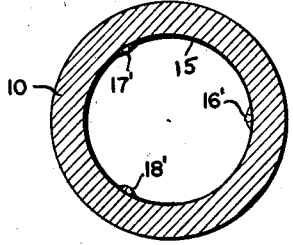
Figure 4:
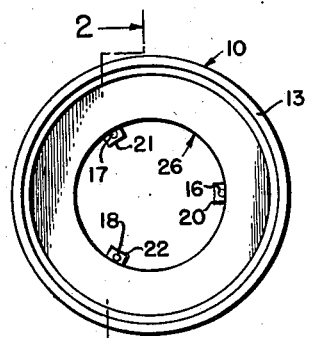
Figure 5:
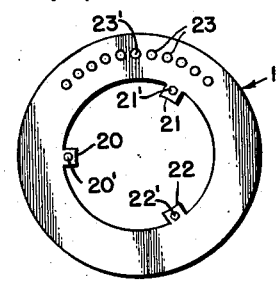
Figure 6:
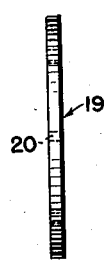

For a better understanding of the invention, reference may be had to the following detailed description taken in connection with the accompanying drawing, in which Figure 1 is a side elevational view of an adjustable flow-inducing pipe fitting embodying the features of the present invention and illustrating the manner in which the same is connected between pipes, Fig. 2 is a longitudinal sectional view of the fitting as viewed on line 2—2 of Fig. 4, Fig. 3 is a transverse sectional view of the fitting as viewed on line 3—3 of Fig. 2, Fig. 4 is an end elevational view of the fitting as viewed along line 4—4 of Fig. 2, Fig. 5 is a plan view of the adjusting ring, and Fig. 6 is an edge elevational view of the adjusting ring.

It is well known that liquid in passing through pipes at the equator does not take a spiral course. Coriolis force at this location on the global surface is negligent. At locations on the global surface above and below the equator in the northern and southern hemispheres causes the rotation of the liquids in passing through pipes in a clockwise direction or to the right above the equator and in a counter-clockwise direction or to the left below the equator. In order to cause spiraling movement at the equator or to augment the spiraling movement removed from the equator and to give sufficient force in a spiral direction through the pipe to scrub the interior thereof and free it of sediment, there has been provided, according to the present invention, in a pipe fitting ribs angularly adjustable upon the interior surface thereof so as to induce a spiraling effect upon the fluid passing through the pipe line. At the equator, the ribs can be adjusted either to the right or to the left since there is no tendency for the liquid to rotate or spiral in the pipe either one way or the other passing therethrough. A maximum angle of adjustment of the ribs would be provided for locations more greatly removed from the equator and so as to augment or increase the spiraling effect beyond the natural spiral force inherent in the fluid at the particular global location.

Referring now to the figures, 10 represents a cylindrical fitting body having an externally-threaded end 11 to secure the fitting body to a pipe 12 as illustrated in Fig. 1 and on the opposite end a flanged internally-threaded sleeve formation 13 adapted to receive a pipe as illustrated at 14 in Figs. 1 and 2. The fitting body 10 has an internal wall surface 15 and at the threaded end 11 of the body, there are anchored at 120 degrees apart, flexible and angularly-adjustable bendable ribs 16, 17 and 18 running along the wall surface. These ribs are anchored by welding or solder as indicated respectively at 16′, 17′ and 18′. These ribs extend throughout the full length of the fitting body and terminate within the internally-threaded sleeve formation 13. Seated within the sleeve formation 13 and abutting the end of the fitting body 10 is an adjusting ring 19 having respectively rigidly inwardly-extending projections 20, 21 and 22 that have respectively holes 20′, 21′ and 22′ through which the ends of the respective ribs 16, 17 and 18 extend. The adjusting ring has a series of adjusting holes 23 running thereabout through an arc of ninety degrees and include a center point hole 23′.

With a special tool adapted to engage the projections 20, 21 and 22, the adjusting ring 19 can be turned to an angle in one direction or the other from a hole 24 in the end of the fitting body 10 and the ring 19 held in its adjusted position by a pin 25 extending through any one of the holes 23 and into the hole 24 on the end of the fitting body 10. The ribs 16, 17 and 18 may be angled to different degrees upon the internal wall surface 15 of the fitting body 10 as illustrated in Fig. 2 and can be adjusted to either the right or left depending upon whether or not the fitting is to be installed north or south of the equator. If the fitting is to be installed north of the equator where the liquid turns in a clockwise direction the adjustment of the ring 19 upon the fitting body would be made to the left and accordingly any liquid passing through the fitting body would be urged by the ribs to spiral in an increased angle in a clockwise direction in passing through the fitting body. The amount of adjustment of the adjusting ring 19 will depend upon the distance the fitting is to be installed from the equator and in an amount beyond the normal spiral angle which the liquid would normally take at that particular location from the equator. The pipe fitting can be delivered to their places of installation ready for use with the adjustment having been made at the factory. A rubber gasket 26 is disposed in the sleeve formation 13 and over the head of the pin 25 and the free ends of the adjustable ribs 16, 17 and 18.

It should now be apparent that there has been provided an adjustable internal rib fitting adapted to be placed into a pipe line in which the internal ribs can be adjusted to different angles according to the distance the fitting is installed from the equator so as to accentuate and augment the spiral movement of the liquid in passing through the pipes in order to induce a non-turbulent flow of the liquid through the pipes. This accentuated flow of the liquid in spiral movement will effect a scrubbing action upon the interior of the pipes and prevent the accumulation of sediment and deposit.

While various changes may be made in the detail construction, it shall be understood that such changes shall be within the spirit and scope of the present invention as defined by the appended claims.

What is claimed is:

1. A flow-inducing pipe fitting comprising a cylindrical body having an internal cylindrical wall surface, means on the respective opposite ends of the fitting adapted to secure the fitting to a pipe line, angularly-adjustable, and bendable rib means anchored to the internal wall surface of the body at one location thereon and means for retaining the rib means in an angularly-adjusted position on the wall surface and angled from its anchor point.

2. A flow-inducing pipe fitting as defined in claim 1, and said retaining means adapted to be turned upon one end of the fitting body to adjust the rib means and adapted to be locked upon the body to hold the rib means in its adjusted position.

3. A flow-inducing pipe fitting as defined in claim 1, and said retaining means being in the form of an angularly-adjustable ring lying flush upon the end of the fitting body with its inner periphery conforming generally to the diameter of the internal wall surface, said rib means being connected to the inner periphery of the ring and a series of adjusting holes in said ring and a retaining pin in said cylindrical body and passing through one of the series of adjusting holes to hold the ring in its angularly-adjusted position.

4. A flow-inducing pipe fitting as defined in claim 3, and in which means are provided to secure the fitting to a pipe end comprising an internally-threaded sleeve formation and said ring lying within the internally-threaded portion and a gasket lying over the retaining pin and the ends of the rib means and adapted to be engaged by a pipe end tightly fitted into said internally-threaded sleeve formation whereby said ring means will be retained flush upon the end of the fitting body and against axial displacement therefrom.

No references cited.